United States Patent Office 3,441,610
Patented Apr. 29, 1969

3,441,610
CATALYTIC HYDROGENATION OF NITRO-
ALKANES TO N-ALKYLHYDROXYLAMINES
John W. Dietz and John R. McWhorter, Jr., Wilmington,
Del., assignors to E. I. du Pont de Nemours and Company, Wilmington, Del., a corporation of Delaware
No Drawing. Continuation-in-part of application Ser. No. 307,807, Sept. 10, 1963. This application Oct. 12, 1967, Ser. No. 674,727
Int. Cl. C07c 87/02; C07b 1/00; B01j 11/08
U.S. Cl. 260—583                                5 Claims

ABSTRACT OF THE DISCLOSURE

Preparing N-alkylhydroxylamines by reacting a nitroalkane with hydrogen in the presence of a recovered palladium catalyst and a cation of iron, nickel or cobalt, in a two-phase liquid system of aqueous sulfuric acid and an immiscible organic solvent.

CROSS REFERENCE

This application is a continuation-in-part of our application Ser. No. 307,807, filed Sept. 10, 1963, now abandoned.

SUMMARY OF THE INVENTION

This invention is directed to an improvement in the method for the preparation of N-alkylhydroxylamine sulfate salts by reaction of nitromethane, nitroethane, 1-nitropropane, or 2-nitropropane with hydrogen in the presence of a palladium catalyst in a two-phase liquid system of aqueous sulfuric acid and an immiscible organic solvent. This improvement is the use in the reaction system of a cation of iron, nickel or cobalt to achieve high conversions of the nitroalkanes to N-alkylhydroxylamine sulfates while employing recovered palladium catalyst.

BACKGROUND OF THE INVENTION

In a known process, McWhorter U.S. Patent No. 3,173,953, N-methylhydroxylamine sulfate is made by reacting nitromethane with hydrogen and sulfuric acid in the presence of a palladium catalyst. Also present is an organic solvent such as toluene which is immiscible with aqueous sulfuric acid, but in which nitromethane is soluble. Although this is an excellent method of preparation, the palladium catalyst on reuse converts nitromethane to N-methylhydroxylamine sulfate at a diminished level. It is then necessary to add fresh catalyst to the process, at considerable expense.

Prior catalyst art teaches the use of metals to promote the activity of palladium catalysts. This art is different from that of our processes. Promoted catalysts contain fully reduced metals, not metallic cations, as promoters. Our process requires soluble metallic cations to provide effective results.

DESCRIPTION OF THE INVENTION

We have now found that conversions of nitromethane can be maintained at a high level, even when employing recovered catalyst providing there is added, with each new charge of raw materials, a cation of iron, nickel, or cobalt which is soluble in the aqueous sulfuric acid phase.

In the operation of our invention, there should be from 100 to 800 parts by weight of iron, nickel or cobalt cation per million parts by weight of aqueous sulfuric acid phase. The preparation of the aqueous sulfuric acid phase is described in U.S. Patent 3, 173,953. Its disclosure is herein incorporated by reference. Preferably, there should be 300 to 500 parts by weight of iron, nickel, or cobalt cations per million parts by weight of the aqueous sulfuric acid phase. These metal cations are most conveniently added as the sulfate salt, although other compounds such as oxides, hydroxides, and carbonates can be used since they will be converted to soluble salts in the aqueous sulfuric acid. Examples of compounds that are usable in our invention are $FeSO_4$, $Fe_2(SO_4)_3$, $NiSO_4$, $CoSO_4$, $FeO$, $Fe_2O_3$, $NiO$, $CoO$, $Fe(OH)_2$, $Fe(OH)_3$, $Ni(OH)_2$, $Co(OH)_2$, $FeCO_3$, $Fe_2(CO_3)_3$, $NiCO_2$, and $CoCO_2$.

The metallic cations are soluble in the aqueous N-alkylhydroxylamine sulfate solution and they are removed with the product. The soluble metallic cations must be added in each succeeding batch.

In order to further explain our invention, the following additional examples are provided.

Example 1

A 5% palladium catalyst supported on carbon is used for hydrogenating nitromethane to N-methylhydroxylamine sulfate according to process conditions outlined below. This catalyst is recovered from the reaction mixture by filtration.

A stirred autoclave is charged with 0.37 gram of the recovered catalyst, 61 grams of toluene, 61 grams of nitromethane, and 90 grams of 60% sulfuric acid containing 0.183 gram of $FeSO_4 \cdot 7H_2O$.

The autoclave is closed and pressurized to 600 p.s.i.g. with hydrogen. The mixture is agitated to improve gas-liquid contact. Cooling water is used to maintain a reaction temperature of 50° C. Hydrogen is admitted as needed to maintain the pressure at 600 p.s.i.g. This procedure is continued until no more hydrogen is taken up by the reaction mass. The reaction is complete in 90 minutes.

The pressure is vented and a two-phase mixture removed from the autoclave. The heavy aqueous phase contains the N-methylhydroxylamine sulfate and the organic phase contains the used catalyst. The yield of N-methylhydroxylamine from nitromethane is about 92%. The catalyst is filtered off and reused still another time according to conditions outlined above. Again, the reaction is complete in 90 minutes.

In similar experiments where no adjuvant is employed, a palladium catalyst used once previously gives only an 80% complete reaction after 90 minutes and a subsequent reuse of this catalyst gives only 50% reaction in 90 minutes. These low yields indicate catalyst ineffectiveness.

Example 2

A hydrogenation is run according to the procedures of Example 1 except that 75 grams of nitroethane is substituted for the 61 grams of nitromethane. In the presence of the same amount of $FeSO_4$ adjuvant the catalyst shows no deterioration of activity or selectivity in producing N-ethylhydroxylamine.

Example 3

A hydrogenation is run according to the procedures of Example 1 except that 89 grams of 1-nitropropane is substituted for the 61 grams of nitromethane and the product is N-n-propylhydroxylamine. Again the catalyst shows no deterioration of activity.

Example 4

A hydrogenation is run according to the procedures of Example 1 except that 89 grams of 2-nitropropane is substituted for the 61 grams of nitromethane and the product is N-isopropylhydroxylamine. The catalyst shows no deterioration of activity.

Example 5

A hydrogenation is run according to the procedures of Example 1 except that 0.35 gram of $NiSO_4 \cdot 6H_2O$ is substituted for the 0.183 gram of $FeSO_4 \cdot 7H_2O$. The catalyst shows no deterioration of activity.

Example 6

A hydrogenation is run according to the procedures of Example 1 except that 0.37 gram of $CoSO_4 \cdot 7H_2O$ is substituted for the 0.183 gram of $FeSO_4 \cdot 7H_2O$. The catalyst shows on deterioration of activity.

Example 7

Seventeen grams of fresh 5% palladium on carbon catalyst are slurried in five liters of 60% sulfuric acid and heated to 50° C. The mixture is stirred and held at 50–55° C. for three hours, then cooled to room temperature. This process provides an accelerated aging process which simulates effective multiple recycle uses of the catalyst in the reduction process. The catalyst is then filtered off and dried.

A stirred autoclave is charged with 2.0 grams of the treated catalyst, 682 grams of nitromethane, 682 grams of toluene, and 1022 grams of 60% sulfuric acid. The autoclave is pressured to 600 p.s.i.g. with hydrogen, stirred, and heated to 55° C. The reaction mixture is held with agitation at 55° C. and 600 p.s.i.g. of hydrogen pressure for two hours. The amount of hydrogen consumed is equivalent to only 17% reduction of the nitromethane to N-methylhydroxylamine, showing that the catalyst was largely inactivated by the sulfuric acid treatment.

A second 2.0 gram sample of the treated catalyst, along with 682 grams of nitromethane, 682 grams of toluene, 1022 grams of 60% sulfuric acid, and 8.3 grams of $FeSO_4 \cdot 7H_2O$ are treated as above. In two hours' time, this reaction mixture consumes an amount of hydrogen equivalent to 50% reduction of the nitromethane to N-methylhydroxylamine. Furthermore, the rate of hydrogen consumption is much greater than if no iron sulfate were added. The reaction is continued for two more hours for a total of four hours before the reaction rate drops to that obtained after only two hours in the test where no iron sulfate is added. Analysis of the aqueous phase shows that 70% of the nitromethane is reduced to N-methylhydroxylamine, and 8% of the nitromethane is reduced to methylamine.

A third 2.0 gram sample of the treated catalyst, along with 682 grams of nitromethane, 682 grams of toluene, 1022 grams of 60% sulfuric acid, and 7.9 grams of $NiSo_4 \cdot 6H_2O$ are treated as above. In two hours' time this reaction mixture consumes an amount of hydrogen equivalent to 55% of the nitromethane. Furthermore, the rate of hydrogen consumption is much greater than if no nickel sulfate were added. The reaction is continued for 1.5 more hours, or a total of 3.5 hours; and still the reaction rate is greater than if no nickel sulfate were added. Analysis of the aqueous phase shows the 75% of the nitromethane is reduced to N-methylhydroxyleamine and only 4% is reduced to methylamine.

A fourth 2.0 gram sample of the treated catalyst, along with 682 grams of nitromethane, 682 grams of toluene, 1022 grams of 60% sulfuric acid, and 8.4 grams $CoSO_4 \cdot 7H_2O$ are treated as above. In two hours' time this reaction mixture consumes an amount of hydrogen equivalent to 55% of the nitromethane. Analysis of the aqueous phase shows that 47% of the nitromethane is reduced to N-methylhydroxylamine and 8% is reduced to methylamine.

We claim:

1. In a process for preparing N-alkylhydroxylamine sulfate in an aqueous sulfuric acid phase of a two phase system by reacting a nitroalkane selected from the group consisting of nitromethane, nitroethane, 1-nitropropane, and 2-nitropropane with hydrogen and sulfuric acid, in the presence of a palladium catalyst and an organic solvent immiscible with aqueous sulfuric acid, the improvement comprising adding to each million parts by weight of the aqueous sulfuric acid phase 100 to 800 parts by weaght of a metallic cation selected from the group of elements consisting of iron, nickel and cobalt.

2. The process according to claim 1 wherein the metallic cation is selected from the compounds consisting of $FeSO_4$, $Fe_2(SO_4)_3$, $NiSO_4$, $CoSO_4$, $FeO$, $Fe_2O_3$, $NiO$, $CoO$, $Fe(OH)_2$, $Fe(OH)_3$, $Ni(OH)_2$, $Co(OH)_2$, $FeCO_3$, $Fe_2(CO_3)_3$, $NiCO_2$, and $CoCO_2$.

3. The process according to claim 1 wherein the metallic cation is derived from $FeSO_4$.

4. The process according to claim 1 wherein the metallic cation is derived from $NiSO_4$.

5. The process according to claim 1 wherein the metallic cation is derived from $CoSO_4$.

References Cited

UNITED STATES PATENTS 3,173,953   3/1965   McWhorter.

CHARLES B. PARKER, *Primary Examiner.*

R. L. RAYMOND, *Assistant Examiner.*

252—472; 260—690.